US 6,616,017 B2

(12) United States Patent
van 't Hoff (10) Patent No.: US 6,616,017 B2
(45) Date of Patent: Sep. 9, 2003

(54) PRESSURE CONTROL DEVICE FOR MAINTAINING A CONSTANT PREDETERMINED PRESSURE IN A CONTAINER

(75) Inventor: Jaap Herman van 't Hoff, Oud-Beijerland (NL)

(73) Assignee: Packaging Technology Holding S.A. (LU)

( * ) Notice: Subject to any disclaimer, the term of this patent is extended or adjusted under 35 U.S.C. 154(b) by 0 days.

(21) Appl. No.: 10/307,419

(22) Filed: Dec. 2, 2002

(65) Prior Publication Data

US 2003/0075568 A1 Apr. 24, 2003

Related U.S. Application Data (63) Continuation of application No. 09/725,130, filed on Nov. 29, 2000, now Pat. No. 6,499,632, which is a continuation of application No. PCT/NL99/00337, filed on May 31, 1999.

(30) Foreign Application Priority Data

May 29, 1998 (NL) .............................................. 1009292
Jun. 2, 1998 (EP) ............................................. 98201819

(51) Int. Cl.⁷ .............................................. B65D 83/14
(52) U.S. Cl. ....................................... 222/389; 222/399
(58) Field of Search .......................... 137/505.41, 906, 137/571; 222/389, 399

(56) References Cited

U.S. PATENT DOCUMENTS

| 2,822,002 | A |   | 2/1958  | Mack ...................... 222/389 X |
| 3,258,163 | A |   | 6/1966  | Brush ...................... 222/399 X |
| 3,347,417 | A |   | 10/1967 | Puster .................... 222/399 X |
| 3,561,649 | A |   | 2/1971  | Wilson ........................ 222/399 |
| 3,995,778 | A |   | 12/1976 | Gamadia ...................... 222/399 |
| 4,181,139 | A |   | 1/1980  | Martini .............. 137/505.25 X |
| 4,310,108 | A |   | 1/1982  | Motoyama et al. ..... 222/399 X |
| 4,456,155 | A |   | 6/1984  | Miyata et al. ............... 222/396 |
| 4,995,533 | A |   | 2/1991  | Vandoninck ............. 222/399 X |
| 5,011,047 | A |   | 4/1991  | Cruysberghs ............... 222/396 |
| 5,090,595 | A |   | 2/1992  | Vandoninck .................. 222/54 |
| 5,110,014 | A |   | 5/1992  | Doundoulakis ......... 222/399 X |
| 5,133,701 | A |   | 7/1992  | Han ........................ 222/389 X |
| 5,285,931 | A |   | 2/1994  | Alfons ........................ 222/61 |
| 5,368,207 | A |   | 11/1994 | Cruysberghs ........... 222/399 X |
| 5,522,526 | A |   | 6/1996  | DeLaforcade et al. ......... 222/1 |
| 5,562,235 | A |   | 10/1996 | Cruysberghs ............... 222/396 |
| 6,131,776 | A | * | 10/2000 | De Laforcade et al. ..... 222/389 |

FOREIGN PATENT DOCUMENTS

| EP | 0 349 053   | 1/1990  |
| EP | 0 446 973   | 9/1991  |
| EP | 0 478 858   | 4/1992  |
| FR | 2 690 142   | 10/1993 |
| WO | WO 90/15377 | 12/1990 |
| WO | WO 93/22222 | 11/1993 |

* cited by examiner

*Primary Examiner*—John Rivell
(74) *Attorney, Agent, or Firm*—Pennie & Edmonds LLP (57) ABSTRACT

A pressure control device for maintaining a constant predetermined pressure in a container which is arranged for dispensing a fluid contained in the container from the container at said pressure, the pressure control device comprising a first chamber and a second chamber, as well as at least one closing member movable relative to the second chamber for releasing and closing a fluid connection between the first chamber and the container depending on the position of the closing member relative to the second chamber. The first chamber is filled with a gas which, in use, has a higher pressure than the pressure in the container. The second chamber is located outside the first chamber.

10 Claims, 5 Drawing Sheets

PRESSURE CONTROL DEVICE FOR MAINTAINING A CONSTANT PREDETERMINED PRESSURE IN A CONTAINER

RELATED APPLICATIONS

This is a Continuation of U.S. application Ser. No. 09/725,130, filed Nov. 29, 2000, now U.S. Pat. No. 6,499,632, which is a Continuation of International Application PCT/NL99/00337, filed May 31, 1999, which published in English as WO 99/62791 under PCT Article 21(2).

BACKGROUND

This invention relates to an assembly comprising a cylindrical container and a pressure control device for maintaining a constant predetermined pressure in the container which is arranged for dispensing a fluid contained in the container from the container at said pressure, the pressure control device comprising a first chamber and a second chamber as well as at least one closing member movable relative to the second chamber for releasing and closing a fluid connection between the first chamber and the container depending on the position of the closing member relative to the second chamber, the first chamber being filled with a gas which in use has a higher pressure than the pressure in the container, and the position of the closing member relative to the first chamber being at least dependent on the prevailing pressure in the container and the prevailing pressure in the second chamber, while in use the fluid connection is released when the pressure in the container decreases below the predetermined pressure, so that gas flows from the first chamber to the container and the pressure in the container increases again until the fluid connection is closed again by the closing member as a result of the increased pressure in the container, wherein the second chamber is located outside the first chamber, and the closing member comprises a stem which extends through a first opening of the first chamber wherein the first opening is provided with a sealing ring and the stem is provided with a circumferencial recess where the sealing ring extends in the recess. Such an assembly is known, from EP-A-0 446 973.

A disadvantage of the known assembly is that the fluid in the container will not always be suspended in a reliable and accurate manner. This means that with the passage of time, diffusion of gas from the first chamber and the second chamber to the container will occur. Since the pressure in the second chamber determines the predetermined pressure in the container of the container, this means that the predetermined pressure over time is unstable. In addition, it is found that the closing member will not react properly to a decreasing and increasing pressure in the container. In that event, accordingly, no accurate pressure control in the container will occur.

Furthermore the closing member is provided with a membrane to which the stem is attached for opening and closing of the first chamber.

This in turn has an adverse effect on the movability of the stem for regulating the pressure. So that pressure control becomes inaccurate This also results in the above disadvantage. Finally if the container is almost empty the effective volume of the container wherein the fluid to be dispensed is present becomes relative large to the volume of the fluid which may cause an inaccurate dispense of the fluid.

SUMMARY OF THE INVENTION

An assembly according to the invention is characterized in that the first chamber comprises a vessel which is provided with a first opening, the second chamber is formed by a cylinder which is closed at a first end and of which a second end constitutes a second opening and the closing member comprises a plunger moveable in the axial direction of the cylinder wherein the plunger is located into the cylinder and comprises the stem which extends from the vessel through the first opening of the vessel and the second opening of the cylinder to the cylinder the plunger is provided on its outer side with a sealing ring which constitutes a gas seal between an outer side of the plunger on one side and an inner side of the cylinder on the other, the vessel being designed as a plunger which is arranged to be received, in the container so as to be movable in axial direction of the container, the vessel dividing the container into an upper and a lower part, the fluid connection terminating in the lower part of the container, while the upper part of the container is filled with the fluid to be dispensed, and in use, when the pressure in the upper part) of the container decreases below the predetermined pressure, the pressure in the lower part of the container will likewise decrease because the vessel designed as a plunger will move such that the volume of the upper part of the container will decrease whereas the volume of the lower part of the container will increase, whereby also the fluid connection between the vessel and the lower part of the container is released, so that gas flows from the vessel to the lower part of the container and the pressure in the lower part of the container as well as the pressure in the upper part of the container will rise again, while the vessel designed as a plunger moves further upwards until the fluid connection is closed again by the closing member as a result of the increased pressure in the lower part of the container.

Because the first chamber comprises a vessel wherein the second chamber is located outside the vessel, the first chamber can be made completely gas tight.

Furthermore because the first chamber comprises a vessel it can easily be designed as a plunger which is arranged to be received, in use, in the container so as to be moveable in axial direction of the container. The container is then divided into an upper and lower part wherein the upper part of the container is filled with the fluid to be dispensed and wherein, in use, the fluid connection terminates in the lower part of the container. If almost all of the fluid in the container has been dispensed, the volume of the upper part will decrease, thereby guarantying an accurate and reliable and stable way of dispensing the residual liquid. Because the second chamber is located outside the vessel it can be formed by a cylinder comprising the plunger moveable in the axial direction of the cylinder. Because the plunger is moveable freely within the cylinder the stem which opens and closes the opening of the vessel responds only to the relevant gas pressures independent from the position of the plunger within the cylinder whereby again a highly accurate way of suspending fluid from the container is guaranteed. Because the outer part of the plunger is provided with a sealing ring a good gas seal between the outer side of the plunger on the one side and the innerside of the cylinder 10 on the other is obtained thereby avoiding that gas can flow from the upper part of the container to the lower part of the container and vice versa.

According to a particular embodiment, the volume of the second chamber is dependent on the position of the closing member relative to the second chamber. In that case, the prevailing pressure of the second chamber alone can be used for determining the predetermined pressure. It is also possible, however, that other means are included in the second chamber for the purpose of exerting a pressure on the closing member. To be considered here is, for instance, a spring.

According to a preferred embodiment, a sidewall of the first chamber is provided with a first opening through which the fluid connection extends, and a sidewall of the second chamber is provided with a second opening, the closing member extending from the first chamber via the first and second opening to the second chamber, a first subsurface of the closing member being situated in the first chamber and a second subsurface of the closing member being situated in the second chamber, the form of the first and second subsurface being such that a certain gas pressure which is exerted on the first subsurface results in a force in a direction of movement of the closing member that is smaller than the force in the direction of movement of the closing member that results when this gas pressure is exerted on the second subsurface, while the first opening can be released or closed by the closing member depending on the position of the closing member relative to the second chamber.

BRIEF DESCRIPTION OF THE DRAWINGS

The invention will presently be further explained with reference to the drawing, in which.

DETAILED DESCRIPTION OF THE PREFERRED EMBODIMENTS

Figure 1:
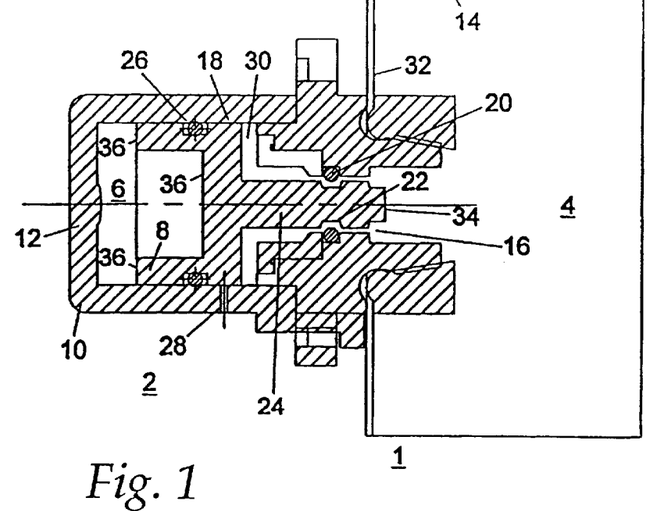
FIG. 1 shows a first embodiment of a pressure control device according to the invention.

In FIG. 1, reference numeral 1 designates a first embodiment of a pressure control device according to the invention. The pressure control device 1 is arranged for maintaining a constant predetermined pressure in a container. The container can comprise, for instance, of an aerosol can which is arranged to dispense a fluid with which the container is filled, from the container at the pressure referred to. An inner space 2 of the container in which the product is contained and which inner space is under pressure, is designated by reference numeral 2.

The pressure control device comprises a first chamber 4 and a second chamber 6. The second chamber 6 is located outside the first chamber. In other words, the second chamber 6 is located outside a space enclosed by the first chamber. The device further comprises a closing member 8, movable relative to the second chamber 6, which forms a part of a valve to be further discussed hereinafter. The second chamber 6 comprises a cylinder 10 which is closed at a first end 12. The cylinder 10 extends at least substantially in the inner space 2 of the container. In this example, the first chamber comprises a vessel 14 which is provided with a first opening 16. In this example, the closing member 8 comprises a plunger 8 movable in the axial direction of the cylinder 10. The plunger 8 extends into the first opening 16. Further, the plunger extends into a second opening 18 of the second chamber 6. In fact, the second opening 18 is formed by the open end of the cylinder 10. The first opening 16 is provided with a sealing ring 20. The sealing ring 20 extends in a circumferential recess 22 of a stem 24 of the plunger 8. Further, on its outer side, the plunger 8 is provided with a sealing ring 26 which constitutes a gas seal between an outer side of the plunger 8 on one side and an inner side of cylinder 10 on the other. The plunger 8 can be reciprocated relative to the second chamber 6 in axial direction between extreme positions which are defined by the width of the recess 22. When in the drawing the plunger has moved to its extreme left position, the plunger 8 will close the first opening 16. Further, in a sidewall of the cylinder 10 an opening 28 is provided at a position located outside the second chamber 6.

In use, the first chamber 4 will be filled with a gas under a relatively high pressure. The inner space 2 of the container as well as the second chamber are each also filled with a gas. The pressure in the container and in the second chamber 6, however, is lower than the pressure in the first chamber 4.

The operation of the device is as follows. The starting-point is that the pressure of the second chamber is approximately equal to the pressure in a space 30 enclosed by cylinder 10, which space 30, however, lies outside the second chamber. The plunger 8 is disposed in its extreme left position, so that the opening 16 is closed. In this example, the sum of the forces exerted on the plunger is substantially determined by the pressure in the second chamber and the pressure in the space 30. The pressure in the first chamber 4 makes only a slight contribution in that the portion of the plunger disposed in the first chamber 4 has a relatively small surface area.

When the pressure in the container starts to decrease as a result of a user drawing fluid from the container, this has as a consequence that the pressure in the inner space 2 of the container will decrease. Via the opening 28, the pressure in the space 30 will then likewise decrease. The pressure in the second chamber 6 will then be higher than the pressure in the space 30. The result is that the plunger in FIG. 1 will move to the right under the influence of the prevailing pressure in the second chamber 6 and the prevailing pressure in the inner space 2 of the container. As a result, the opening 16 is released. When the opening 16 is released, this entails the release of a fluid connection between the first chamber 4 and the inner space 2 of the container. This fluid connection extends through the opening 16 and through the opening 28. Because the pressure in the first chamber 4 is higher than the pressure in the inner space 2 of the container, gas will start to flow from the first chamber 4 to the inner space 2 of the container. As a result, the pressure in the inner space 2 of the container will start to rise again. At a certain moment, the pressure in the inner space 2, and hence also the pressure in the space 30, has risen to the extent where the plunger 8 will be moved to the left again and eventually close the opening 16 again. In this way, again a state of equilibrium is achieved, with the pressure in the inner space 2 of the container back at the original level. In this example, the volume of the first chamber is much greater than the volume of the second chamber. As a result, on the one hand sufficient gas can be received in the first chamber 4 to restore the pressure in the container a large number of times. On the other hand, the small second chamber 6 is advantageous in that it enables a compact design of the device. In this example, the volume of the second chamber 6 is dependent on the position of the closing member relative to the second chamber. Also, in this example, a sidewall 32 of the first chamber is provided with the opening 16 through which the fluid connection extends. Further, a sidewall of the second chamber is provided with the opening 18. In fact, the opening 18 is formed by the open end of the cylinder 10. Further, the closing member extends from the first chamber 4 via the openings 16 and 18 to the second chamber 6. A first subsurface 34 of the closing member is situated in the first chamber, while a second subsurface 36 of the closing member is situated in the second chamber 6. Because the surface of the first subsurface 34 is much smaller than the surface of the second subsurface 36, the force which is exerted on the closing member as a result of the pressure of the gas will be determined to a relatively slight extent by the pressure in the first chamber 4. The prevailing pressure in the second chamber 6, as well as the pressure in the inner space 30, yield comparatively much greater forces that are exerted on the closing member 8. Accordingly, the form of the first and second subsurface is such that a certain gas pressure exerted on the first subsurface results in a force in a direction of movement of the closing member that is smaller than the force in the direction of movement of the closing member which results when this gas pressure is exerted on the second subsurface. The state of equilibrium in which the fluid connection, i.e. the opening 16, is closed is therefore substantially determined by the pressure prevailing in the second chamber 6 and is at least substantially independent of the pressure prevailing in the first chamber 4.

Figure 2:
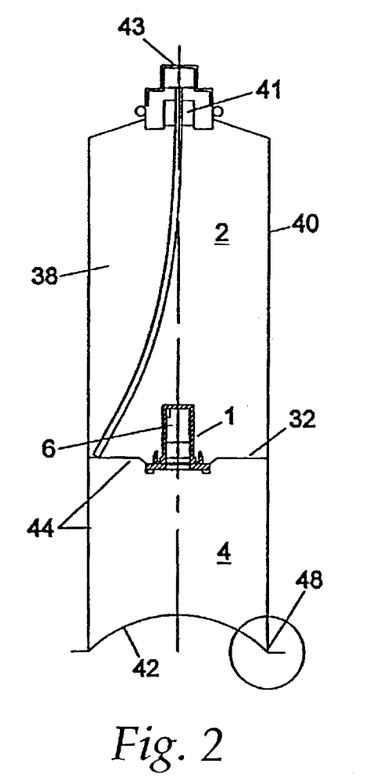
FIG. 2 shows a first possible use of the pressure control device according to FIG. 1 in a container.

FIG. 2 shows a possible use of the device according to FIG. 1 in a container 38, designed as an aerosol can. Parts corresponding to FIG. 1 are provided with the same reference numerals. The container comprises a vessel 40 with a bottom 42. At its top, the vessel 40 is provided with a valve 41, known per se, which is provided with a push button 43. Upon energization of the push button 43, the fluid contained in the inner space of the container squirts out. The first chamber comprises a cup-shaped holder 44 which is placed upside down in the container 40. The cup-shaped holder 44 has its longitudinal edge 48 joined together with the bottom 42 and the upright sidewall of the vessel 40. In an opening of the wall 32 of the first chamber 44, the remainder of the pressure control device 1 is arranged. The operation of the assembly corresponds entirely to that discussed in relation to FIG. 1.

Figure 3:
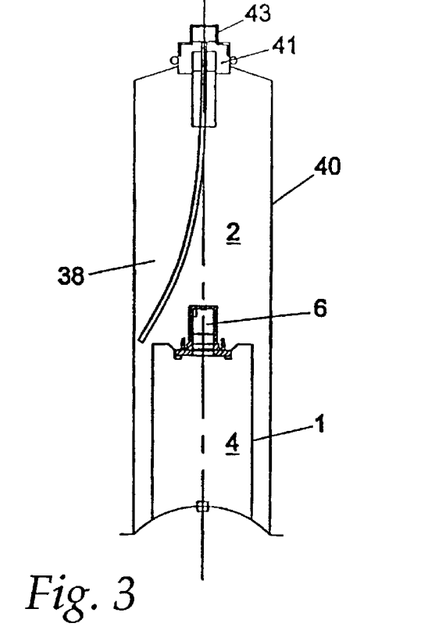
FIG. 3 shows the second possible use of the pressure control device according to FIG. 1 in a container.

FIG. 3 shows a container which is provided with a pressure control device according to FIG. 1. However, the diameter of the first chamber 4 is smaller than that discussed in relation to FIG. 2. The operation, however, is wholly identical.

Figure 4:
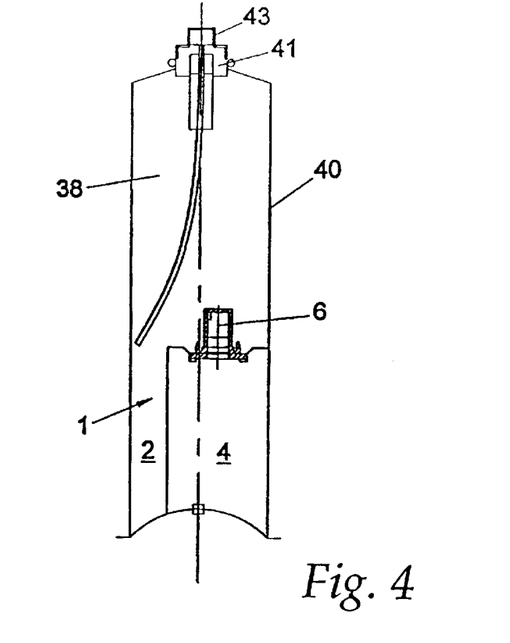
FIG. 4 shows a third possible use of the pressure control device according to FIG. 1 in a container.

FIG. 4 also shows a container comprising a device according to FIG. 1. Again, the diameter of the first chamber 4 is smaller than the diameter of the vessel 40. In this case, however, the first chamber 4 is not accommodated concentrically within the vessel 40. However, the operation is again entirely analogous to that discussed in relation to FIG. 1.

Figure 5:
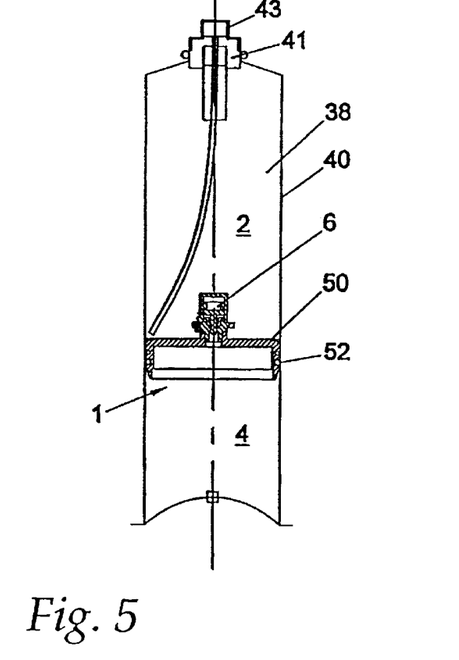
FIG. 5 shows a fourth possible use of the pressure control device according to FIG. 1 in a container.

The vessel 40 of the container according to FIG. 5 is provided with a disc 50 slightly below the middle of the height of the vessel. The disc 50 is gas-tightly connected with the inside of the vessel 40 through a sealing ring 52. The disc 50 thus divides the vessel 40 into two parts. The upper part constitutes the inner space 2 of the container, in which the fluid to be dispensed is stored, while the lower part of the vessel 40 in fact constitutes the first chamber 4. Accordingly, the disc 50 constitutes a partition between the inner space 2 of the container and the first chamber 4 and so corresponds to the wall indicated in FIG. 1 by reference numeral 32. The remainder of the pressure control device 1 corresponds entirely to the pressure control device 1 as discussed in relation to FIG. 1.

Figure 6A:
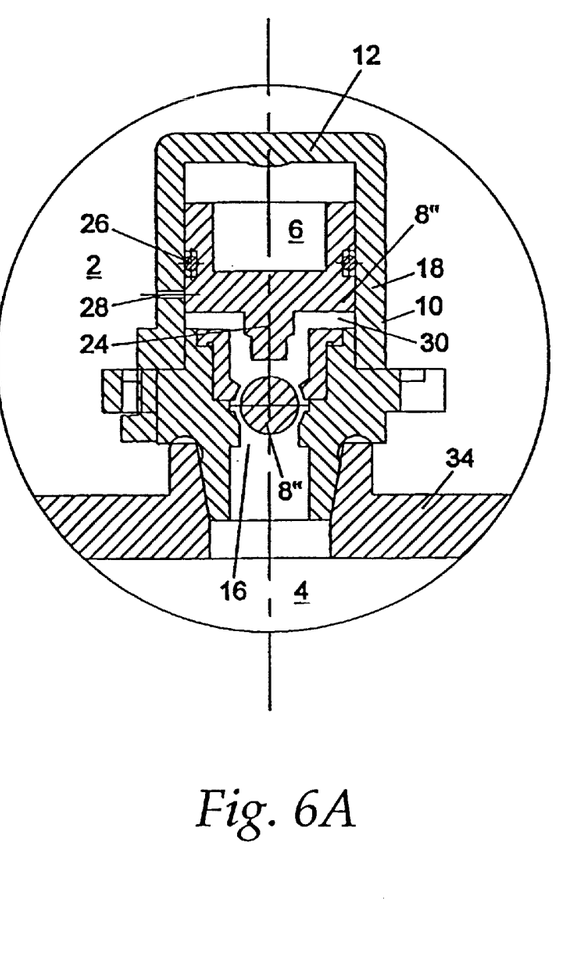
FIG. 6a shows a second embodiment of a pressure control device according to the invention.

FIG. 6a shows a second embodiment of a pressure control device according to the invention. Parts corresponding to FIG. 1 are provided with the same reference numerals. In this example, however, the device comprises a first closing member 8' and a second closing member 8". The first closing member 8' is spherical, designed as a ball. Depending on the position of the first closing member 8' relative to the first chamber 4, the first opening 16 is closed or released. The second closing member 8" is designed as a plunger which is received in the second chamber 6 so as to be movable in the axial direction of the second chamber 6. The stem 24 of the plunger extends outside the second chamber 6 as far as, or close to, the first closing member 8'. The volume of the second chamber is again dependent on the position of the second closing member 8", designed as a plunger, relative to the second chamber 6. This position is again dependent on the prevailing pressure in the second chamber 6 as well as on the prevailing pressure in the inner space 2 of the container. As discussed hereinbefore, the prevailing pressure in the container 2 is equal to the prevailing pressure in the space 30. In this example, under the influence of the high pressure in the first chamber 4, the first closing member 8' moves upwards, thereby closing the opening 16. As a result, in this situation, the plunger 8" is not subject to any forces that are dependent on the gas pressure in the first chamber 4. When as a result of product being drawn from the container, the pressure in the inner space 2 starts to decrease, the pressure in the space 30 will likewise start to decrease. Under the influence of the prevailing pressure in the space 30 and in the second chamber 6, in FIG. 6a the plunger 8" will start to move downwards. The stem 24 will then contact the ball 8' and move it downwards. As a result, the opening 16 is released and a fluid connection will extend from the first chamber 4 through the opening 16 and the opening 28 to the inner space 2 of the container. As a result, gas will flow from the first chamber 4 to the inner space of the container and the pressure in this inner space will thereby rise again. As a result, the pressure in the space 30 will likewise start to rise. When the pressure in the inner space 2 of the container rises further, eventually the plunger 8" will be moved upwards again, with the result that the ball 8" will close the opening 16 again. Then a new state of equilibrium is achieved again, with the pressure in the container being equal again to the original pressure before the state of equilibrium was left. It is noted that in this example too, the cylinder 10 extends substantially in the inner space 2 of the container and the second chamber 6 is positioned outside the first chamber 4.

Figure 6B:
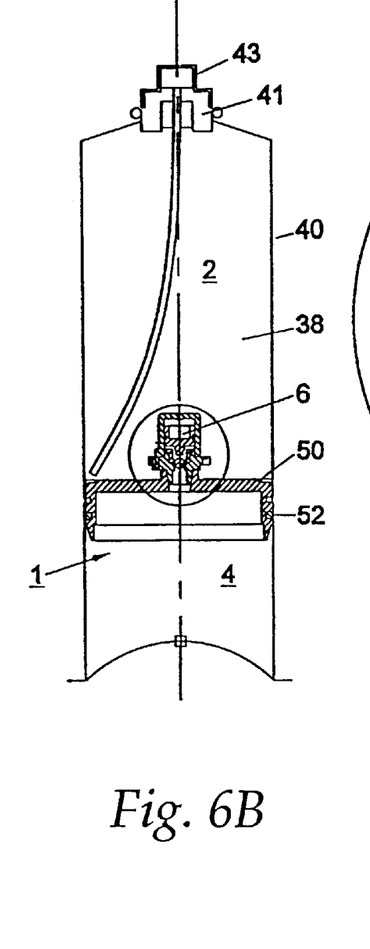
FIG. 6b shows a possible use of the pressure control device according to FIG. 6a in a container.

FIG. 6b shows how the device of FIG. 6a can be used in a container. Here, the same constructions are used as discussed in relation to FIG. 5. It is also possible, however, to use the constructions according to FIG. 2, 3 or 4 for the device according FIG. 6a.

Figure 7:
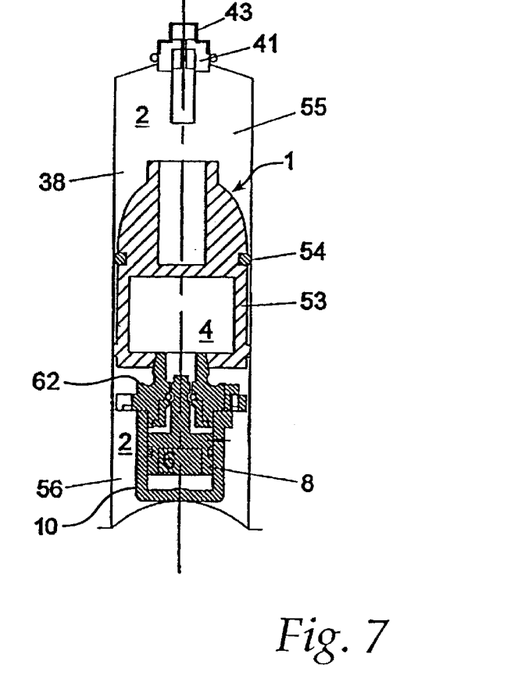
FIG. 7 shows a third embodiment of a pressure control device according to the invention which is used in a container.

FIG. 7, finally, shows a third possible embodiment of a pressure control device according to the invention used in a container. Here, parts corresponding to the preceding figures are again provided with the same reference numerals.

Figure 7A:
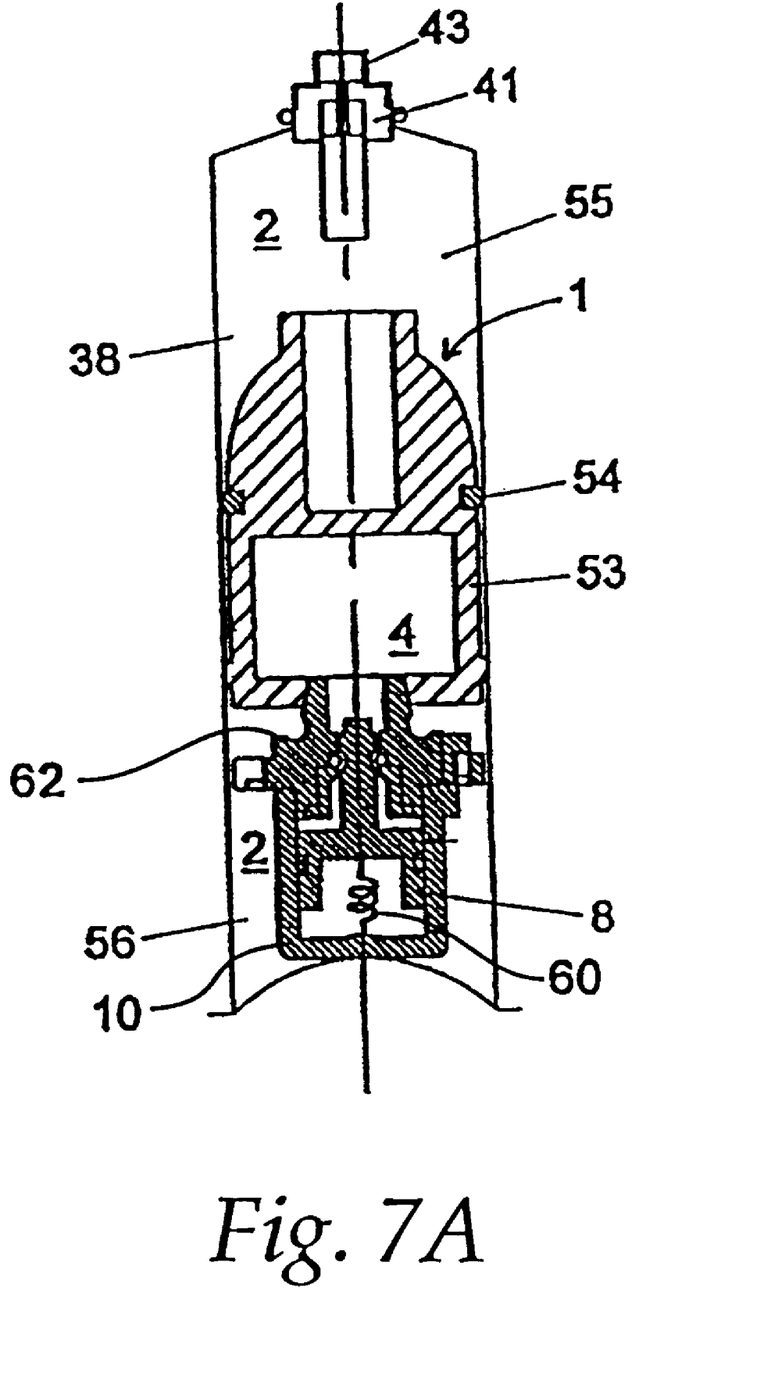
FIG. 7a shows the third embodiment using a spring means in the second chamber to exert a force against the closing member.

The pressure control device 1 shown in FIG. 7 substantially corresponds to the device according to FIG. 1. It is pointed out with emphasis, however, that use could also be made of the device according to FIG. 6a. The device 1 is arranged to be received in a cylindrical container 38. The first chamber 4, on the outer side thereof, is formed in a first housing designed as a plunger 53 which is arranged to be received, in use, in the container 38 so as to be movable in the axial direction of the container 38. The plunger 53 that forms the first chamber 4 is provided, on the outer side thereof, with a sealing ring 54. The first chamber 4 divides the inner space 2 of the container 38 into an upper part 55 and a lower part 56. The fluid connection referred to above terminates in the lower part 56. In this example, the upper part 55 of the container 38 is filled with the fluid to be dispensed. A second housing, preferably comprising a cylinder 10, is connected to the plunger 53 via an intermediate member 62. The second housing accommodates the second chamber 6 which may be filled with a gas, as discussed above with respect to FIG. 1, or may include spring means 60 to exert a force against the closing member 8, as seen in FIG. 7a.

In a state of equilibrium, the pressure in the upper part 55 will be approximately equal to the pressure in the lower part 56. When, on the other hand, the pressure in the upper part 55 starts to decrease because fluid is being drawn from the container, the plunger 53 and hence the entire device 1 will move upwards under the influence of the higher pressure in the lower part 56. As a result, the pressure in the lower part 56 will decrease, while the pressure in the upper part 55 will rise. Eventually, the pressure in the upper part 55 will be equal again to the pressure in the lower part 56. However, because the pressure in the lower part 56 has decreased, the closing member 8 of the device 1 will open the fluid connection between the first chamber 4 and the lower part 56. The result is that gas flows from the first chamber 4 to the lower part 56 of the container. As a result, the pressure in the lower part 56 will rise again until eventually the pressure in the lower part 56 is equal again to the predetermined pressure. At the same time, the entire device 1 will move further upwards under the influence of the rising pressure in the lower part 56.

In a newly achieved equilibrium situation, therefore, the entire device 1 has moved further upwards, with the pressure in the upper part 55 being equal to the pressure in the lower part 56 and the pressure in the lower part 56 being equal to the predetermined pressure, so that eventually in the entire inner space of the container the pressure is equal to the predetermined pressure.

A major advantage of this embodiment is that the volume of the upper part 55 decreases according as more fluid is drawn from the container. The residual fluid is therefore concentrated in a smaller volume. What is thus accomplished is that an optimum amount of fluid can be dispensed and eventually only a small amount of fluid is left behind in the container when it is nearly empty.

Figure 8:
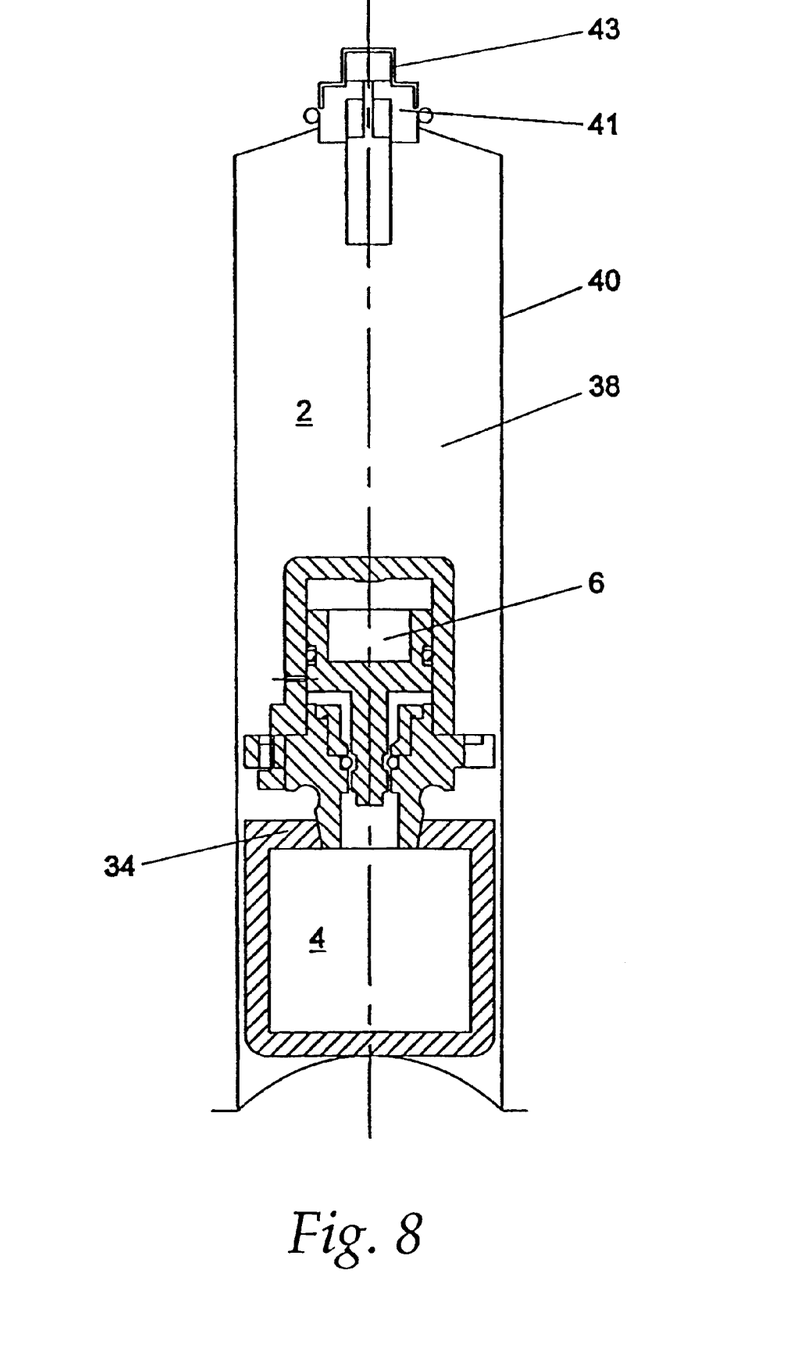
FIG. 8 shows the fourth embodiment of a pressure control device according to the invention which is used in a container.

FIG. 8 shows another possible use of the device according to FIG. 1 in a container 38 designed as an aerosol can. Parts corresponding to FIG. 1 are provided with the same reference numerals.

In the device according to FIG. 8, the first chamber 4 is of cylindrical design. The same applies to the container 38. An outer diameter of the first chamber 4 corresponds at least substantially to an inner diameter of the container 38. In this example, the first chamber is placed near, in this case even on, a bottom of the container. The second chamber 6 is disposed above the first chamber 4. Accordingly, the second chamber 6 is disposed in the inner space 2 of the container, in use filled with the product to be dispensed. Further, this inner space 2 is situated above the first chamber 4. In this example, the first chamber 4 is a tight fit in the container 38 and so remains in place even when the container is turned upside down.

An advantage of the device according to FIG. 8 is that in contrast to the device according to FIG. 6b, no sealing 52 needs to be present, since the first chamber 4 is inherently fully gas-tight.

It is noted that the invention is not in any way limited to the embodiments outlined hereinbefore. Thus, the device according to FIG. 6 can also be used as discussed in relation to FIG. 7. In that case, the first chamber 4 of the device according to FIG. 6 will likewise function as a plunger which is received in the cylindrical container so as to be movable in axial direction. Similarly, the device according to FIG. 6 can be used as discussed in relation to FIG. 8. In that case, the first chamber will likewise be made of a cylindrical design as shown in FIG. 8.

Such variants are each understood to fall within the scope of the invention.

What is claimed is:

1. An assembly comprising a cylindrical container and a pressure control device (1) for maintaining a constant predetermined pressure in the container (53) which is arranged for dispensing a fluid contained in the container (53) from the container at said pressure, the pressure control device comprising a first chamber (4) and a second chamber (6) as well as at least one closing member (18) movable relative to the second chamber (6) for releasing and closing a fluid connection (16,28) between the first chamber (4) and the container (53) depending on the position of the closing member (18) relative to the second chamber (6), the first chamber (4) being filled with a gas which in use has a higher pressure than the pressure in the container (53), and the position of the closing member (8) relative to the first chamber (4) being at least dependent on the prevailing pressure in the container (53) and the prevailing pressure in the second chamber (6), while in use the fluid connection (16,28) is released when the pressure in the container (53) decreases below the predetermined pressure, so that gas flows from the first chamber (4) to the container (53) and the pressure in the container (53) increases again until the fluid connection (16,28) is closed again by the closing member (8) as a result of the increased pressure in the container (53), wherein the second chamber (6) is located outside the first chamber (4), and the closing member (8) comprises a stem (24) which extends through a first opening (16) of the first chamber (4) wherein the first opening (16) is provided with a sealing ring (20) and the stem (24) is provided with a circumferential recess (22) where the sealing ring (20) extends in the recess (22), the first chamber (4) comprising a vessel (14) which is provided with the first opening (16), the second chamber (6) being formed by a cylinder (10) which is closed at a first end (12) and of which a second end constitutes a second opening (18) and the closing member (8) comprises a plunger (8) moveable in the axial direction of the cylinder (10) wherein the plunger (8) is located into the cylinder (10) and comprises the stem (24) which extends from the vessel (14) through the first opening (16) of the vessel (14) and the second opening (18) of the cylinder (10) to the cylinder (10), the plunger (8) being provided on its outer side with a sealing ring (26) which constitutes a gas seal between an outer side of the plunger (8) on one side and an inner side of the cylinder (10) on the other, and wherein:

the outer diameter of the cylinder (10) is smaller than the outer diameter of the vessel (14) wherein the vessel (14) is designed as a plunger (53) which is arranged to be received, in the container (38) so as to be movable in axial direction of the container (38), the vessel (14) dividing the container (38) into an upper (55) and a lower part (56), the fluid connection (16) terminating in the lower part (56) of the container (38), while the upper part (55) of the container (38) is filled with the fluid to be dispensed, and in use, when the pressure in the upper part (55) of the container (38) decreases below the predetermined pressure, the pressure in the lower part (56) of the container (38) will likewise decrease because the vessel (14) designed as a plunger (53) will move such that the volume of the upper part (55) of the container (38) will decrease whereas the volume of the lower part (56) of the container (38) will increase, whereby also the fluid connection (16) between the vessel (14) and the lower part (56) of the container (38) is released, so that gas flows from the vessel (14) to the lower part (56) of the container (38) and the pressure in the lower part of the container as well as the pressure in the upper part (56) of the container (38) will rise again, while the vessel (14) designed as a plunger (53) moves further upwards until the fluid connection (16) is closed again by the closing member (8) as a result of the increased pressure in the lower part (55) of the container (38).

2. The assembly according to claim 1, wherein the closing member (18) is located mostly outside the vessel (14).

3. The assembly according to claim 1, wherein the closing member (8) is connected with the second chamber (6) so as to be movable between a first and second extreme position.

4. The assembly according to claim 2, wherein the closing member (8) is connected with the second chamber (6) so as to be movable between a first and second extreme position.

5. The assembly according to claim 1, wherein the volume of the vessel (14) is greater than the volume of the second chamber (6).

6. The assembly according to claim 1, wherein the volume of the second chamber (6) is dependent on the position of the closing member (18) relative to the second chamber (6).

7. The assembly according to claim 6, wherein:

a first subsurface of the closing member is situated in the first chamber;

a second subsurface of the closing member is situated in the second chamber, the form of the first and second subsurfaces being such that a certain gas pressure which is exerted on the first subsurface results in a force in a direction of movement of the closing member that is smaller than the force in the direction of movement of the closing member which results when this gas pressure is exerted on the second subsurface, while the first opening can be released or closed by the closing member depending on the position of the closing member relative to the second chamber.

8. The assembly according to claim 7, wherein the second opening forms a gas seal with the closing member.

9. The assembly according to claim 1, wherein the cylinder (10) extends into the lower part of the container.

10. The assembly according to claim 1, wherein the cylinder (10) is provided with at least one side opening (28) at a position located outside the second chamber, the at least one side opening (28) forming part of the fluid connection (16, 28) between the first chamber (4) and the lower part of the container (53).

* * * * *